United States Patent [19]

Darm

[11] Patent Number: 4,484,451
[45] Date of Patent: Nov. 27, 1984

[54] TWO-STAGE GAS CONDENSER WITH FEEDBACK COOLING

[75] Inventor: William J. Darm, Tigard, Oreg.

[73] Assignee: United Air Specialists, Inc., Cincinnati, Ohio

[21] Appl. No.: 157,932

[22] Filed: Jun. 9, 1980

Related U.S. Application Data

[63] Continuation of Ser. No. 939,334, Sep. 5, 1978, abandoned, which is a continuation-in-part of Ser. No. 567,258, Apr. 11, 1975, Pat. No. 4,140,175, which is a continuation-in-part of Ser. No. 468,659, May 10, 1974, Pat. No. 3,905,805, and a continuation-in-part of Ser. No. 473,512, May 28, 1974, Pat. No. 3,982,588.

[51] Int. Cl.$^3$ ............................................. F28B 7/00
[52] U.S. Cl. ......................................... 62/90; 55/80; 55/269; 62/93; 62/95; 165/113; 165/DIG. 12; 165/DIG. 18
[58] Field of Search ............... 55/80, 269; 62/272, 62/90, 93, 95; 165/DIG. 12, 66, 113, DIG. 18

[56] References Cited

U.S. PATENT DOCUMENTS

| | | | |
|---|---|---|---|
| 2,960,836 | 11/1960 | Haringhuizen | 55/80 |
| 3,165,903 | 1/1965 | Roc et al. | 62/93 |
| 3,225,517 | 12/1965 | Wachsmuth | 55/80 |
| 3,587,243 | 6/1971 | Keller et al. | 62/93 |
| 3,827,343 | 8/1974 | Darm | 165/DIG. 12 |

FOREIGN PATENT DOCUMENTS

| | | | |
|---|---|---|---|
| 1202252 | 8/1970 | United Kingdom | 55/269 |

Primary Examiner—Sheldon J. Richter
Attorney, Agent, or Firm—Frost & Jacobs

[57] ABSTRACT

A gas condenser apparatus and method is described employing two heat exchanger stages for condensing water vapor and other contaminates, such as organic solvents, out of hot air or other treated gas by means of a cooling gas which is provided by feeding back the treated gas through the cooling passages of such heat exchanger stages after removal of the water and solvents. The heat exchangers are of the counterflow type so that the treated gas and the cooling gas flow in opposite directions therethrough. Preferably, water vapor is removed from the treated gas by condensing it in the first stage and the solvents are removed by condensing them in the second stage thereby separating the condensed water and solvents. Auxiliary cooling coils are provided at the input of the first stage and at the output of the second stage for further cooling of the treated gas. A temperature sensor at the output of the first stage controls the input cooling coil in order to maintain the temperature of the treated gas at the output of the first steps above the freezing temperature of water. The treated gas is used as cooling gas and is fed back first through the output heat exchanger stage and then through the input stage in a sequence opposite to that of the flow of the treated gas. This results in a very efficient operation in which the temperature difference between the treated gas input and the cooling gas output is small, typically only about 20° F.

5 Claims, 2 Drawing Figures

TWO-STAGE GAS CONDENSER WITH FEEDBACK COOLING

RELATED APPLICATION

This application is a continuation of my U.S. patent application Ser. No. 939,334, filed Sept. 5, 1978 and entitled "Two-Stage Gas Condenser With Feedback Cooling", now abandoned, which is a continuation-in-part of my earlier filed U.S. patent application Ser. No. 567,258, filed Apr. 11, 1975 and entitled "Vertrical Counterflow Heat Exchanger Apparatus", now U.S. Pat. No. 4,140,175 which is a continuation-in-part of Ser. No. 468,659, filed May 10, 1974, now U.S. Pat. No. 3,905,850, and a continuation-in-part of Ser. No. 473,512, filed May 28, 1974, now U.S. Pat. No. 3,982,588.

BACKGROUND

The subject matter of the present invention relates generally to gas condenser apparatus and method employing heat exchangers having cooling gas passages to condense water and other contaminates such as organic solvents from the treated gas. In particular, the present invention relates to such a condenser apparatus and method employing two heat exchanger stages with a feedback means for transmitting the treated gas from the output of the second stage back through both stages to provide the cooling gas for more efficient operation. In addition, preferably the treated gas is cooled sufficiently in the first stage to condense water vapor out of the gas in such first stage while the treated gas is further cooled in the second stage to condense the solvents. This separates the condensed water and solvents, enabling the solvents to be reused more readily.

Previously, it has been known to use counterflow type heat exchangers as condensers. However, the cooling fluid has been a separate gas or liquid from the gas being cooled, as shown in U.S. Pat. No. 3,827,343 of W. J. Darm, granted Aug. 6, 1974, U.S. Pat. No. 3,232,029 of W. R. Evans, Jr., granted Feb. 1, 1966 and U.S. Pat. No. 2,169,054 of J. J. Mojonnier, granted Aug. 8, 1939. This second patent is not a counterflow heat exchanger and while it employs two heat exchanger stages, the second stage is a heater, not a condenser. Also, in none of these patents is the cooling fluid provided by feeding back the gas being treated after condensation of water vapor or solvent from such gas. As a result, the condensers of these patents are not as efficient as that of the present invention.

British Patent Specification No. 711,067 of Guinot, granted June 23, 1954, shows a condenser system employing two heat exchanger stages for cooling. However, the second stage is employed for cooling the cooling liquid used in the first stage. In addition, this cooling liquid is separate from the treated gas which is condensed in the first stage. Therefore, the present invention differs in several respects from this patent. Furthermore, in none of the above discussed patents is the water condensed in one heat exchanger stage while the solvents are condensed in a second heat exchanger stage to separate the condensed water and solvent in the manner of the present invention.

SUMMARY OF INVENTION

It is therefore one object of the present invention to provide an improved gas condenser apparatus and method which is highly efficient and after condensation employs the treated gas as the cooling gas of such condenser apparatus.

Another object of the invention is to provide such a condenser apparatus and method employing two heat exchanger stages for cooling the treated gas and which feeds back the cooling gas through such stages in reverse order from that of the treated gas flowing through such stages during condensation.

A further object of the invention is to provide such a condenser apparatus and method in which the temperature of the treated gas at the input of the first stage is only slightly higher than the temperature of the cooling gas at the output of the cooling passages of such first stage.

An additional object of the present invention is to provide such a heat exchanger apparatus and method in which water is condensed out of the treated gas in the first stage and organic solvents are condensed out of the treated gas in the second stage to separate the condensed water and solvents, thereby enabling reuse of these solvents more readily whenever feasible.

Still another object of the present invention is to provide such a condenser apparatus and method in which the temperature of the treated gas at the output of the first condenser stage is maintained above the freezing temperature of water while moisture is condensed out of the treated gas in such first stage.

A still further object of the present invention is to provide such a condenser apparatus with an automatic control in which an auxiliary cooling coil is employed at the input of the first stage to cool the treated gas in accordance with a control signal produced by a temperature sensor at the output of such first stage to maintain the temperature of the treated gas at such output above the freezing temperature of water.

DRAWINGS

Other objects and advantages of the present invention will be apparent from the following detailed description of a preferred embodiment thereof and from the attached drawings, of which:

FIG. 1 is a schematic diagram showing one embodiment of the condenser apparatus of the present invention; and FIG. 2 is a perspective view of a portion of the heat exchanger used in the apparatus of FIG. 1.

DESCRIPTION OF PREFERRED EMBODIMENT

Figure 1:
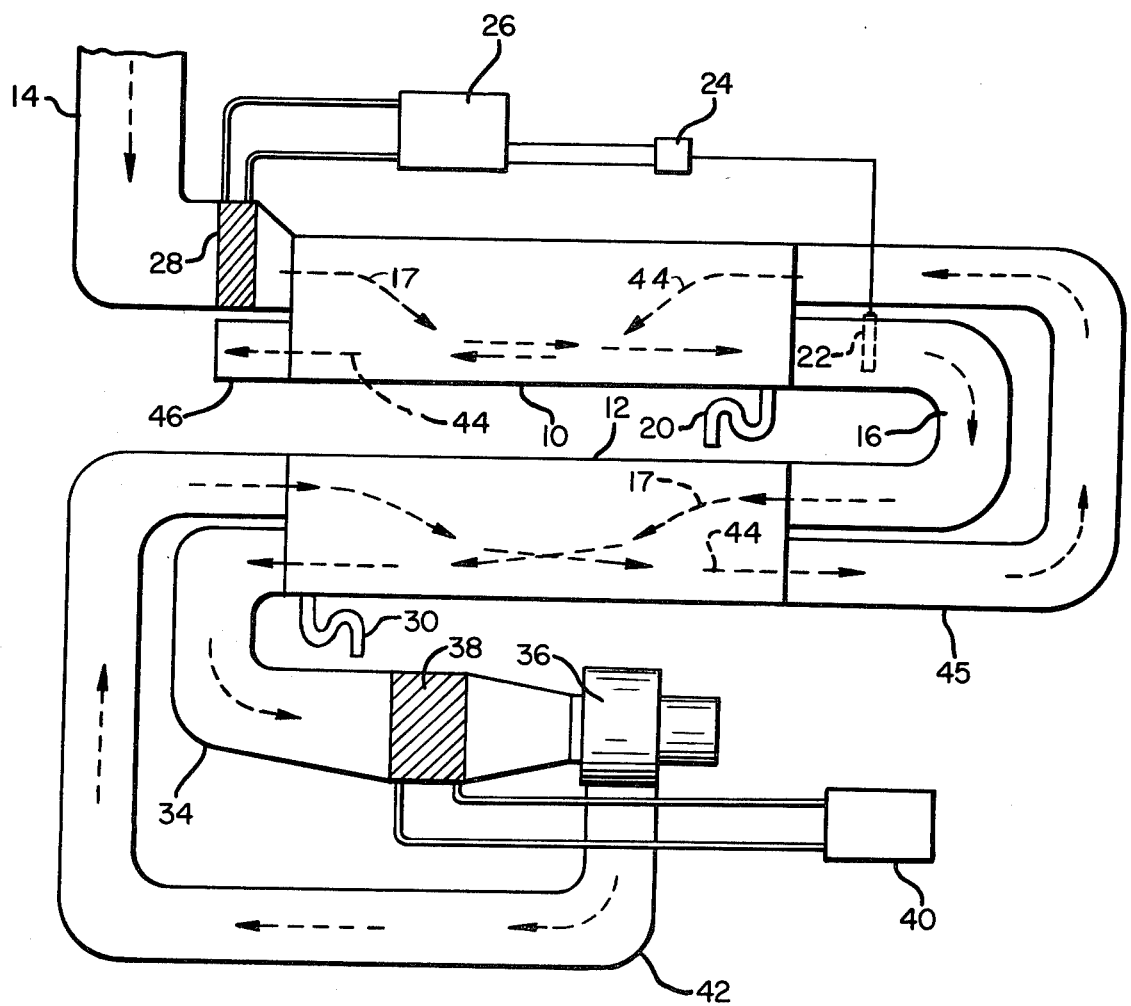

As shown in FIG. 1, the condenser apparatus of the present invention includes an input heat exchanger stage 10 and an output heat exchanger stage 12 which may be of the counterflow type shown in my U.S. Pat. No. 3,912,004. Each heat exchanger includes a separate housing 10 or 12 containing a first set of passages for the treated gas and a second set of passages for the cooling gas separated by heat exchanger plates, as hereafter discussed in reference to FIG. 2. An input conduit 14 for transmitting hot air or other gas to be treated, is connected to the input of the first set of passages of heat exchanger 10. A connection conduit 16 is connected from the output of the first set of passages of heat exchanger 10 to the input of the first set of passages of heat exchanger 12 so that treated air is transmitted along paths 17 through both heat exchangers. Cooling gas is transmitted in the opposite direction through the second set of passages of heat exchangers 10 and 12 in order to cool the hot gas being treated. The treated gas is cooled to a lower temperature, typically about 32° F. at the output of such heat exchanger when it enters the connection conduit 16. As a result, water vapor present in the treated gas transmitted through input conduit 14 is condensed in the input heat exchanger stage 10. The condensed moisture flows down the heat exchanger plates and is removed from such input stage through drain 20 at the output end of the first set of passages.

In order to prevent the condensed water from freezing in the heat exchanger 10, a temperature sensor 22 is provided in the connection conduit 16 and is connected electrically or pneumatically to a controller 24 which automatically controls a compressor 26 connected to a cooling coil 28 provided at the input of the heat exchanger 10 within conduit 14. This cooling coil is a conventional closed refrigeration coil which may be filled with gas refrigerant. Thus, the temperature sensor 22 measures the temperature of the cooled gas after it leaves the heat exchanger 10 and as such temperature reaches 32° F., the sensor 22 operates the controller 24 to cause the auxiliary cooling coil 28 to perform less cooling of the input gas, thereby maintaining the temperature of the cooled gas at the output of the heat exchanger above 32° F., or other predetermined temperature at which frost forms or the condensed water freezes in such heat exchanger. In one typical example, when the hot air or treated gas in input conduit 14 is at a temperature of approximately +150° F., the cooling coil 28 is provided with a suction temperature of about +90° F., thereby cooling the treated gas to approximately +100° F. to +125° F. before it enters the heat exchanger 10 and maintaining such treated gas at an output temperature of about 32° F.

The second heat exchanger stage 12 further cools the treated gas from +32° F. to about −30° F. and causes organic solvents to condense out in such heat exchanger. The condensed solvents are drained from the first passages in exchanger 12 through drain 30 at the output end thereof. An output conduit 34 is connected from the output of the first passages in heat exchanger 12 to the inlet of a fan 36. The treated gas flowing through conduit 34 is further cooled by a second cooling coil 38 of similar type to that of coil 28 provided at the outlet of conduit 34. The low temperature cooling coil 38 is connected to another refrigerating apparatus 40 providing a suction temperature of about −60° F. As a result, the treated gas is cooled and transmitted from the output of the fan 36 at a temperature of about −50° F. It should be noted that some additional condensation may occur in the conduit 34 so that a drain may be provided in such conduit between cooling coil 38 and fan 36.

A feedback conduit 42 is connected from the output of the fan 36 to the input of the second set of passages of the second heat exchanger 12, such second passages transmitting cooling fluid through the heat exchangers in opposite direction to the treated gas, as shown by the dashed line path 44 of the cooling gas through such second passages. Thus, the treated gas after it has been cooled, condensed and transmitted from the output of the second heat exchanger stage 12 is further cooled by cooling coil 38 and then fed back through the heat exchangers 12 and 10 in the order named, as the cooling gas of such heat exchangers. The temperature of the gas at the output of conduit 34 is not sufficiently low so that it can be used as a cooling gas without further cooling. Therefore, the cooling coil 38 is necessary to further cool the gas before it can be employed as the cooling gas of the heat exchangers.

A second connection conduit 45 is connected from the output of the second passages of the second heat exchanger stage 12 to the input of the second passages of the first heat exchanger stage 10 to supply cooling gas to the first stage. This cooling gas flows in opposite direction to the treated gas flowing in stage 10 along path 17, as shown by the dashed line arrow 44 indicating the path of such cooling gas. The cooling gas is transmitted through a cooling gas outlet conduit 46 connected to the output of the cooling passages of stage 10 at a temperature which, for the example given, is typically about +130° F. Thus, the temperature difference between the treated gas supplied to input conduit 14 and the cooling gas discharged through the outlet conduit 46 is only about 20° F. In the examples given the system temperature difference between the output cooling gas at the output 46 of the cooling passages of the first heat exchanger and the input gas at the input of the first passages of such heat exchanger connected to coil 28, is only about 5° to 30° F. This system temperature difference is much less than the heat exchanger temperature difference between the input gas and the dried input gas at the input and output of the first exchanger 10 which is 93° to 60° F. and between the dried input gas and the treated gas at the input and output of the second exchanger 12 which is 62° F. As a result, very little energy is consumed by the condenser apparatus of the present invention. This high efficiency is due in part to the feedback of treated gas through the cooling passages of both stages 10 and 12. In the example given, with an air flow through conduits 14, 16, 32, 42 and 44 of about 1900 cubic feet per minute, the compressors 26 and 40 may each by typically of a ten ton capacity. It should be noted that the controller 24 loads and unloads the compressor 26 in response to the temperature signal emitted by sensors 22 to vary the cooling effect of the cooling coil 28.

In the embodiment described, the drain 30 drains the solvent from stage 12 into a settling tank from where it can be removed off the top of the liquid in such tank while any small amount of water which might accumulate in the tank is drained from the bottom thereof. Thus, the solvents can be reused or they can be fed to a fractional distilling apparatus to separate the solvents into their basic components before reuse. However, in some cases the solvents are not of sufficient value for reuse. In those cases it is not important to separate them from the water. Therefore, the water and the solvent can both be condensed in the second heat exchanger unit 12 and drained through drain 30 to a suitable storage tank before being thrown away. In this latter case, the condenser apparatus of the present invention would normally be used in a manner to eliminate air pollution contaminants and thereby satisfy Environmental Protection Agency requirements, such as by being connected to the output stack of a wood veneer dryer. In addition, rather than employing the auxiliary cooling coil 28, compressor 26, controller 24 and temperature sensor 22 to maintain the temperature of the gas above freezing, it is possible to eliminate those elements and simply provide an automatic shutdown of the condenser for a predetermined period in each eight hour shift to defrost the heat exchangers.

Figure 2:
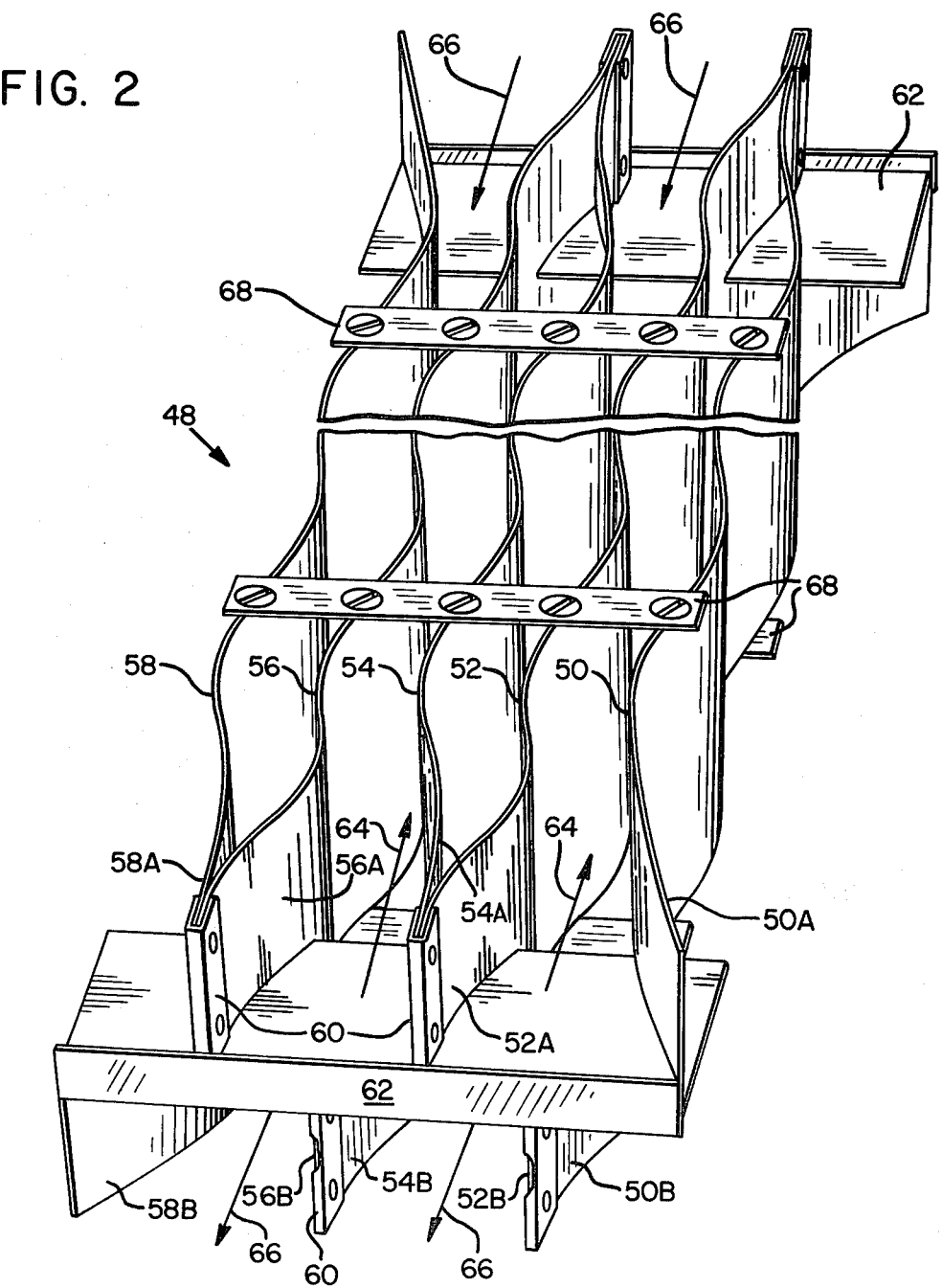

While the other flow through type heat exchangers can be employed for the heat exchanger stages 10 and 12 in the condenser apparatus of the present invention, the split ended type heat exchanger 48 shown in FIG. 2, described in my earlier U.S. Pat. No. 3,912,004, is preferable. In this heat exchanger the opposite ends of the heat exchanger plates 50, 52, 54, 56 and 58 are split into two end portions which are joined to different ones of the end portions of the two heat exchanger plates on the opposite sides thereof. Thus, split end portion 58A is connected to split end portion 56A, while split end portion 56B is connected to split end portion 54B by means of riveted connecting members 60. The split ends of the heat exchanger plates are separated by a divider plate 62 which are sealed to such heat exchanger plates by epoxy resin or other suitable airtight sealing material to provide a first set of passages 64 through which the treated gap flows, and a second set of passages 66 through which the cooling gas flows. This is a counterflow type heat exchanger so the treated gas in passages 64 and the cooling gas in passages 66 flow in opposite directions on opposite sides of the heat exchanger plates. Spacer clips 68 may be provided across the top and bottom edges of the heat exchanger plates to hold them in spaced relationship, or spacer bumps may be provided on the surfaces of the heat exchanger plates for engaging plates on opposite sides thereof to maintain predetermined spaced relationship between the plates, as discussed in my U.S. Pat. No. 3,912,004. It should be noted that the housing 10 or 12 for the heat exchanger has been removed in FIG. 2 and would be bonded to the top and bottom edges of the heat exchanger plates by synthetic plastic material to seal the sides of the passages 64 and 66.

It will be obvious to those having ordinary skill in the art that many changes may be made in the details of the preferred embodiment of the present invention without departing from the spirit of the invention. Therefore, the scope of the present invention should only be determined by the following claims.

I claim:

1. A method for treating gas to remove water vapor and solvent vapor having different condensation temperatures, comprising the steps of:

transmitting an input gas containing water vapor and organic solvent vapor through first passages in a first heat exchanger;

transmitting a cooling gas through cooling passages in said first heat exchanger to cool said input gas to a temperature below the condensation temperature of water to cause at least a portion of water vapor therein to condense as a liquid on the walls of said first passages so that a dried input gas containing solvent vapor is provided at the output of said first passages;

transmitting said dried input gas through second passages in a second heat exchanger;

transmitting a cooling gas through cooling passages in said second heat exchanger to cool said dried input gas to a temperature in said second passages below the condensation temperature of said solvent to cause a portion at least of the solvent vapor therein to condense as a liquid on the walls of said second passages to provide a treated gas at the output of said second passages;

removing the condensed solvent from said second heat exchanger;

cooling said treated gas to a temperature below the condensation temperature of the input gas component condensed in said second heat exchanger to form said cooling gas;

and feeding back said cooling gas through said cooling passages of said second heat exchanger and said first heat exchanger in the order named.

2. A method in accordance with claim 1 in which the cooling gas is transmitted from the output of the cooling passages of the first heat exchanger with a system temperature difference with respect to the input gas at the input of the first passages which is less than the temperature difference between the input gas at the output of the first passages and the treated gas at the output of the second passages.

3. A method in accordance with claim 2 in which said system temperature difference is less than the first heat exchanger temperature difference between the input gas and the dried input gas at the input and output of said first passages and the second heat exchanger temperature difference between the dried input gas and the treated gas at the input and output of said second passages.

4. A method in accordance with claim 1 in which the temperature of the input gas flowing through said first passages is maintained above the freezing temperature of water.

5. A method in accordance with claim 1 in which at least the major portion of said water vapor is condensed out of the input gas in said first heat exchanger.

* * * * *